United States Patent [19]

Nishiguchi et al.

[11] Patent Number: 4,544,326

[45] Date of Patent: Oct. 1, 1985

[54] VARIABLE-CAPACITY RADIAL TURBINE

[75] Inventors: Fumio Nishiguchi, Yokohama; Hiroshi Komatsu, Yokosuka, both of Japan

[73] Assignee: Nissan Motor Co., Ltd., Yokohama, Japan

[21] Appl. No.: 564,671

[22] Filed: Dec. 23, 1983

[30] Foreign Application Priority Data

| Dec. 28, 1982 | [JP] | Japan | 57-227644 |
| Dec. 29, 1982 | [JP] | Japan | 57-197687[U] |
| Dec. 29, 1982 | [JP] | Japan | 57-233853 |
| Jul. 14, 1983 | [JP] | Japan | 58-126993 |
| Sep. 6, 1983 | [JP] | Japan | 58-162495 |

[51] Int. Cl.$^4$ .................. F04D 29/44; F04D 27/00
[52] U.S. Cl. .................. 415/151; 415/205; 415/219 R; 60/602
[58] Field of Search .......... 415/151, 204, 205, 219 R, 415/219 A, 219 B, 219 C, 155, 38, 45, 29, 44; 60/602, 605

[56] References Cited

U.S. PATENT DOCUMENTS

| 3,614,259 | 10/1971 | Neff | 415/151 |
| 4,138,849 | 2/1979 | Wilber | 415/151 |
| 4,389,845 | 6/1983 | Koike | 415/205 |
| 4,443,153 | 4/1984 | Dibelius | 415/151 |

FOREIGN PATENT DOCUMENTS

| 2230718 | 6/1979 | Fed. Rep. of Germany | 415/205 |
| 1281774 | 7/1972 | United Kingdom | 415/151 |
| 2035467 | 6/1980 | United Kingdom | 415/204 |

Primary Examiner—Robert E. Garrett
Assistant Examiner—H. Edward Li
Attorney, Agent, or Firm—Schwartz, Jeffery, Schwaab, Mack, Blumenthal & Evans

[57] ABSTRACT

A turbine scroll passage of a turbine is divided into first and second scroll passages extending in parallel to each other along the scroll passage. The first passage is formed with a side aperture for directing the fluid in the scroll passage to a turbine wheel. The second passage is isolated from the side aperture by a partition wall separating the second passage from the first passage. The partition wall is formed with a longitudinally extending opening for providing a fluid communication between the first and second passages. The opening extends longitudinally through about 360 degrees around the axis of the turbine, and has a constant width over its length. In the secondary passage, there is disposed a valve of a swing, rotary or other type, for closing the secondary passage. When the turbine is a part of a turbocharger connected with an internal combustion engine, the secondary passage is closed by the valve in a low engine speed range. The opening of the partition wall and the valve are designed in various ways.

25 Claims, 27 Drawing Figures

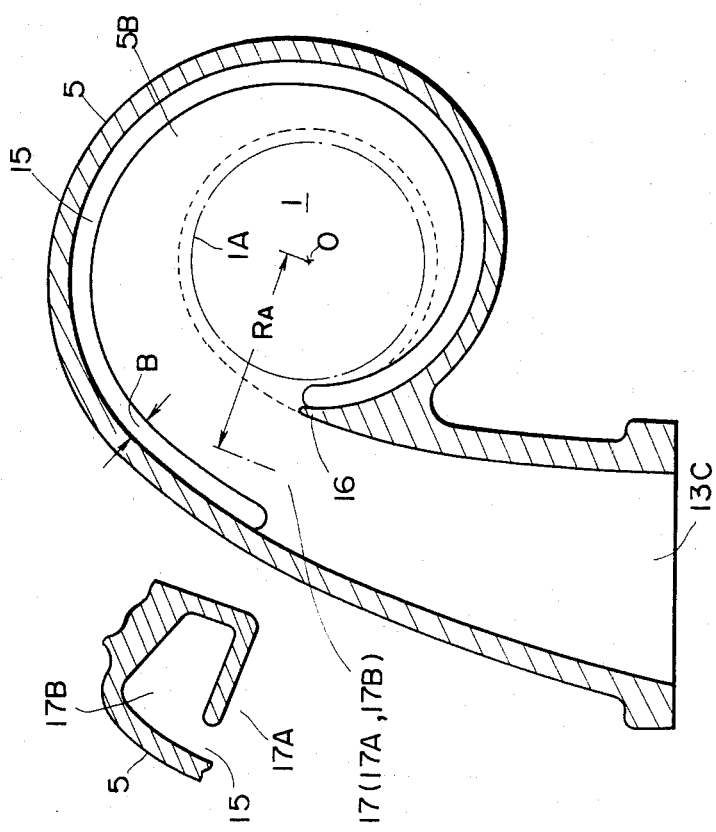

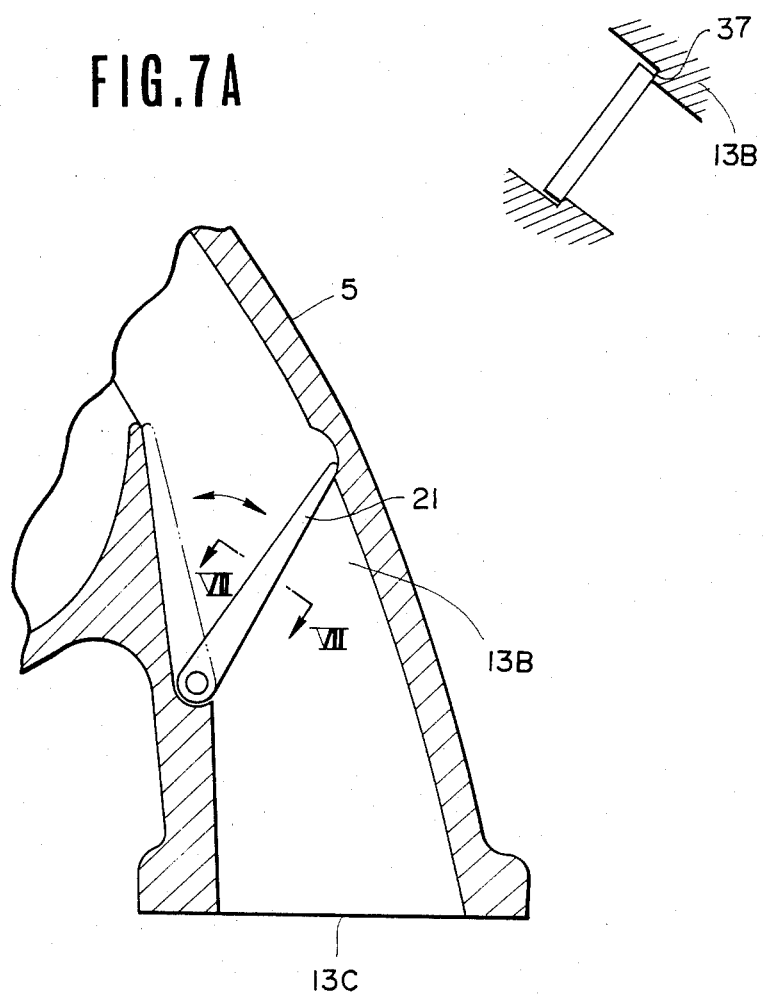

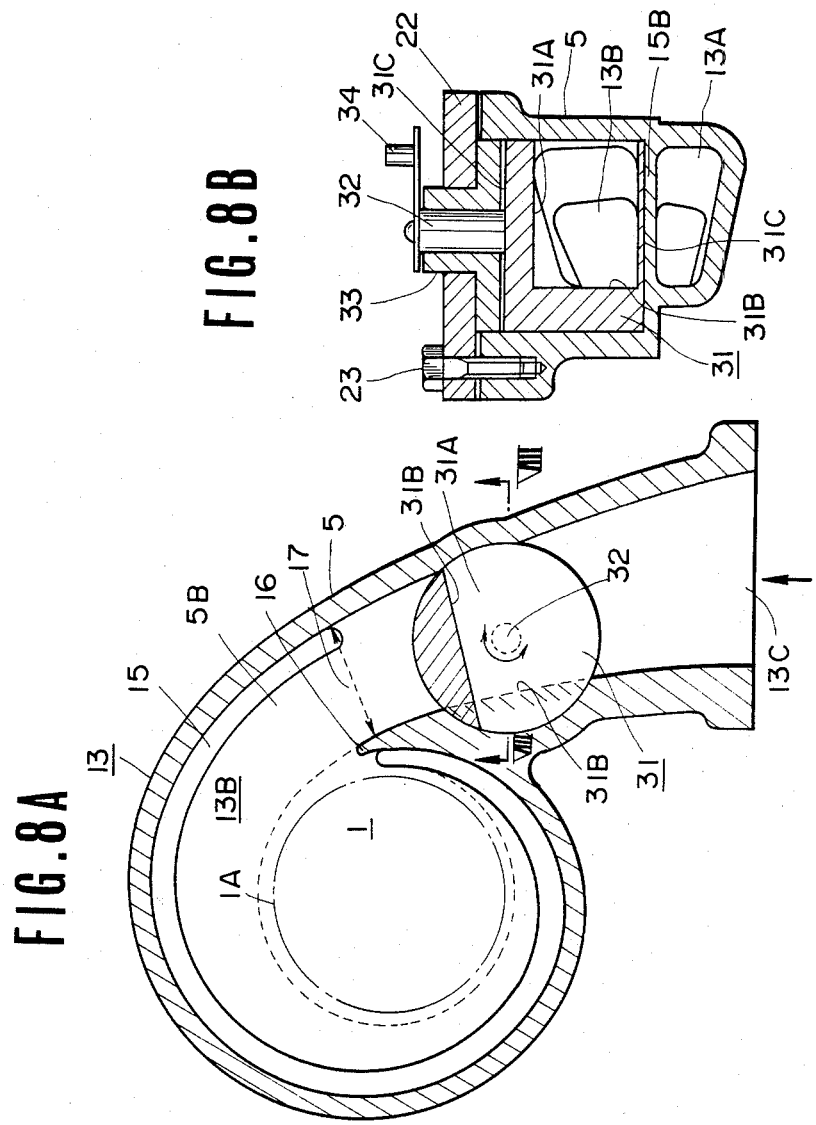

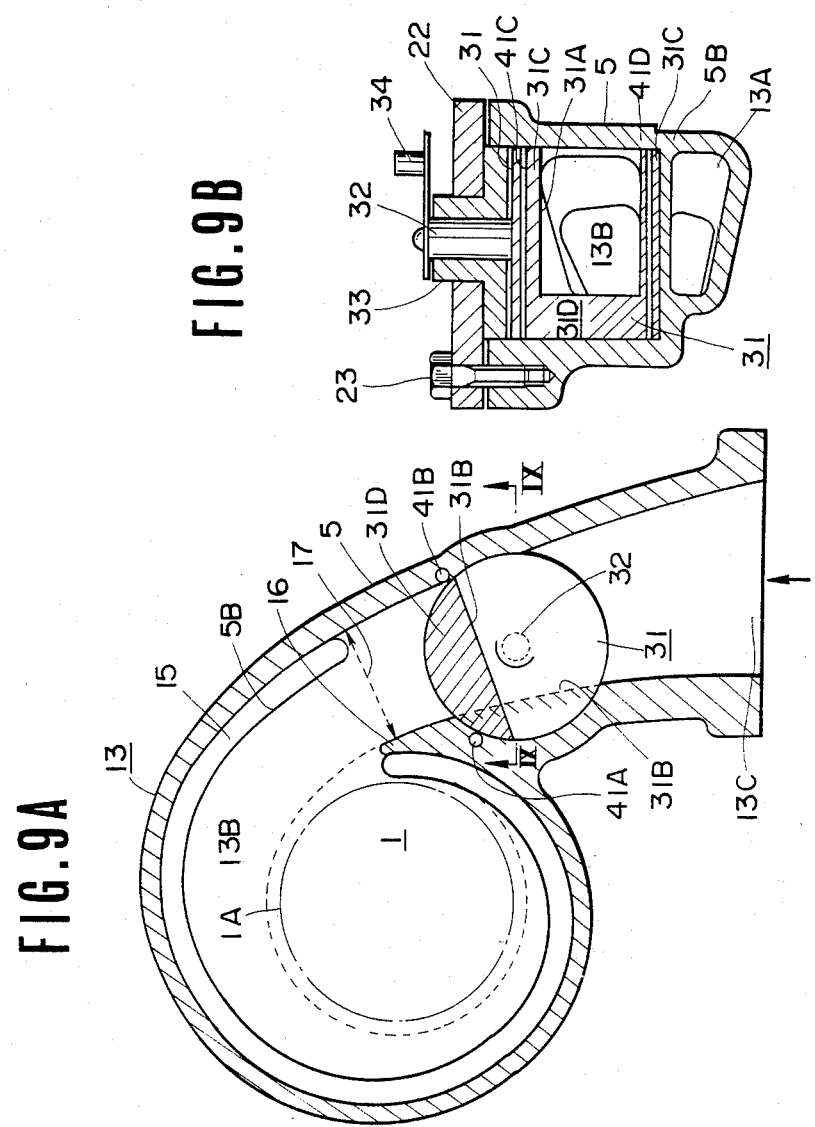

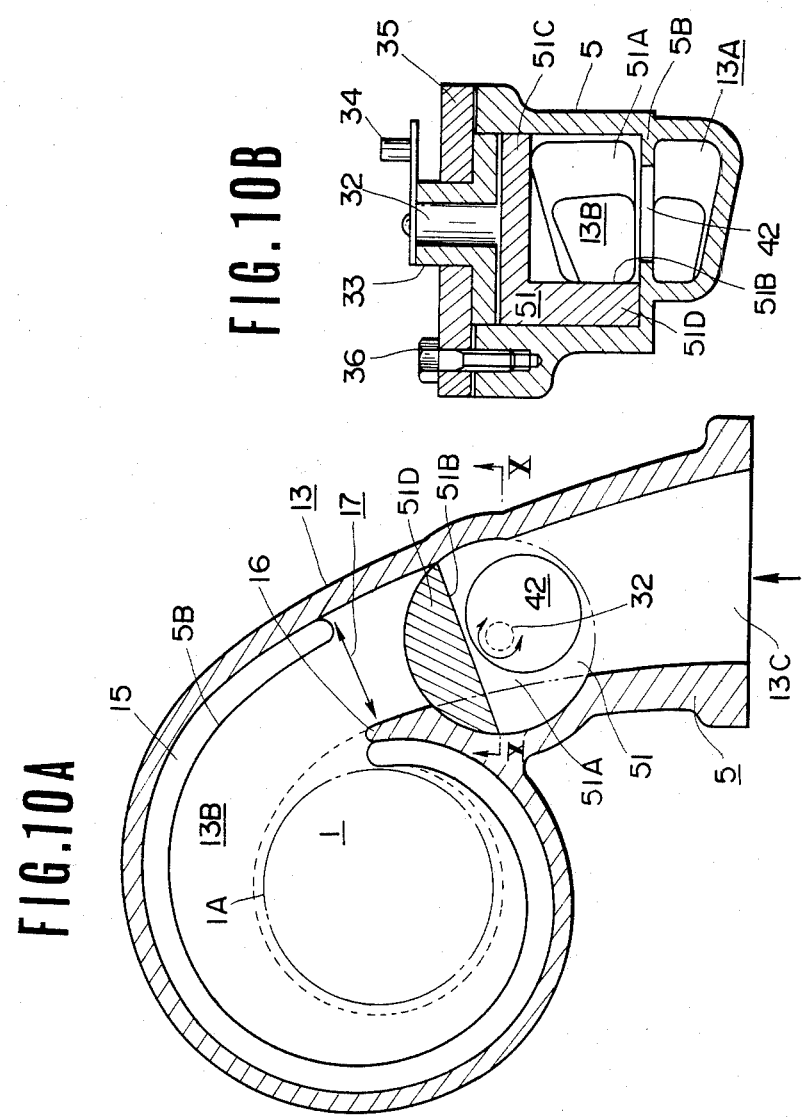

VARIABLE-CAPACITY RADIAL TURBINE

BACKGROUND OF THE INVENTION

The present invention relates to a variable-capacity radial turbine which is capable of varying the size of an inlet of a turbine scroll passage, and which is especially suitable for a turbocharger of an internal combustion engine.

There is known a turbine of a turbocharger whose scroll passage is divided into two parallel scroll passages. One scroll passage is closed by a valve in a certain engine operating condition. Both scroll passages have inner side apertures opening toward the outer periphery of the turbine wheel. However, this scroll design causes a reduction of the turbine efficiency. When one passage is closed by the valve, there is formed a dead fluid zone in the closed passage. In this scroll design, the thus formed dead fluid zone is disturbed by the fluid moving around the turbine wheel, as explained more in detail later, so that the energy of the fluid is lost in the closed passage, and the turbine efficiency is reduced.

SUMMARY OF THE INVENTION

It is an object of the present invention to provide a variable-capacity radial turbine having at least two parallel scroll passages so designed as to guide a fluid efficiently to a turbine wheel with a minimum energy loss of the fluid both when one passage is closed and when both or all passages are open.

It is another object of the present invention to improve the arrangement and design of a valve disposed in a scroll passage of a variable-capacity radial turbine.

According to the present invention, the variable-capacity radial turbine comprises a turbine wheel or turbine rotor, a turbine housing enclosing the turbine wheel, and valve means. The turbine housing has an inlet port for receiving a fluid, a scroll passage for directing the stream of the fluid from the inlet port to the turbine wheel, a turbine wheel chamber containing the turbine wheel, and an outlet passage for discharging the fluid from the wheel chamber. The scroll passage is divided into a first scroll passage and a second scroll passage by a partition wall which extends longitudinally in the scroll passage so as to form two parallel flow paths. The first scroll passage is formed with a side aperture through which the fluid in the first scroll passage is allowed to flow toward the outer periphery of the turbine wheel. The partition wall is formed with an opening through which the fluid is allowed to flow between the first and second passages. The opening extends longitudinally of the scroll passage. The valve means is connected to the turbine housing for opening and closing the second scroll passage.

Preferably, the second scroll passage is isolated from the wheel chamber by the partition wall so that the fluid in the second passage can flow into the wheel chamber only through the opening and the side aperture of the first passage. That is, the cross section of the second scroll passage is enclosed by walls of the turbine housing, and is open only in the opening of the partition wall.

The partition wall is substantially normal to the axis of the turbine wheel, or slightly inclined with respect to a plane normal to the axis of the turbine wheel.

It is preferable to make the opening long and uniform. Preferably, the opening extends through an angle of almost 360 degrees around the turbine wheel, and the width of the opening is constant substantially over the full length.

In one embodiment, the opening extends along the outer periphery of the scroll passage. In another embodiment, the opening is bounded by two concentric circles with their common center lying on the axis of the turbine wheel, as viewed in a section cut by a plane normal to the axis of the turbine wheel. In this case, the opening, as viewed in a section cut by a plane passing through the axis of the turbine wheel, is bounded between two coplanar parallel straight lines. These parallel straight lines are parallel to the axis of the turbine wheel, or inclined. In the latter case, the two parallel lines are inclined in such a manner that the opening is wider apart from the axis of the turbine wheel on the first passage's side than on the second passage's side.

It is preferable that the valve is disposed in the second scroll passage within the turbine housing at a position upstream of and near to an upstream end of the opening of the partition wall. The valve may be of a swing or rotary type.

BRIEF DESCRIPTION OF THE DRAWINGS

FIG. 5A is a sectional view taken along a line V—V of FIG. 4;

FIG. 5B is a fragmentary sectional view of a turbine scroll at a throat portion;

FIG. 7A is a fragmentary sectional view of a swing valve and a turbine scroll of a modified design;

FIG. 7B is a fragmentary sectional view taken along a line VII—VII of FIG. 7A;

FIG. 8A is a sectional view of a turbine of a third embodiment, which has a rotary valve;

FIG. 8B is a sectional view taken along a line VIII—VIII.

FIG. 9A is a sectional view of a turbine of a fourth embodiment, which has a rotary valve provided with seal members;

FIG. 9B is sectional view taken along a line IX—IX of FIG. 9A;

FIG. 10A is a sectional view of a turbine of fifth embodiment, which has a rotary valve and a hole formed in a partition wall at a position upstream of the valve;

FIG. 10B is a sectional view taken along a line X—X of FIG. 10A;

DETAILED DESCRIPTION OF THE INVENTION

Figure 1:
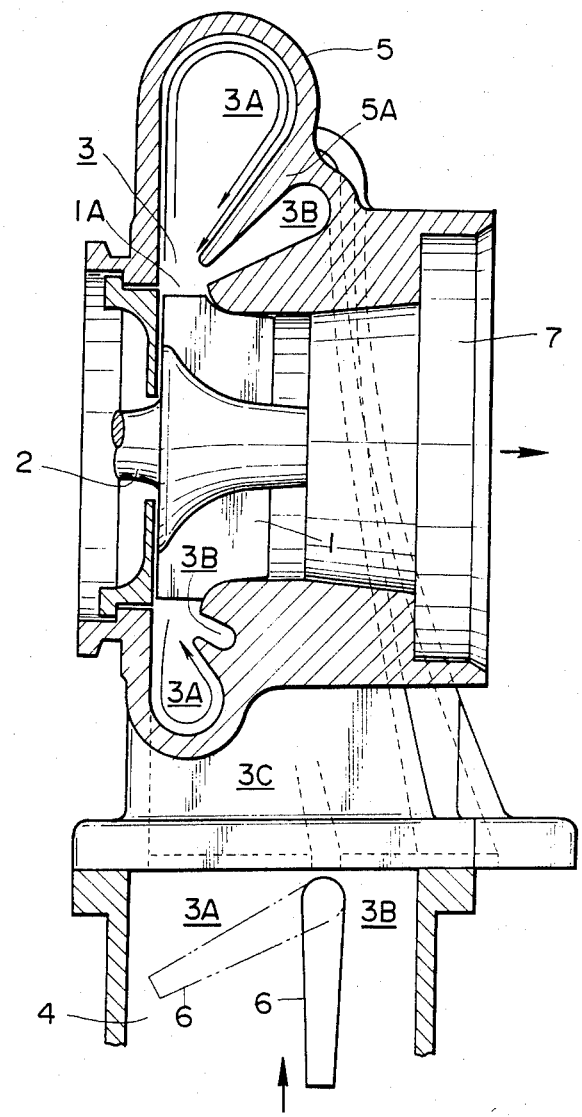
FIG. 1 is a sectional view of a variable-capacity turbine of a conventional type.

FIG. 1 shows a conventional example of a variable-capacity radial turbine of a turbocharger, as disclosed in Japanese Utility Model provisional publication No. 57-11233. In FIG. 1, a turbine wheel or rotor 1 is mounted on a shaft 2. A compressor wheel (not shown) is mounted on the other end of the shaft 2. The turbine wheel 1 is surrounded by a turbine scroll passage 3 formed in a turbine housing 5. An engine exhaust duct 4 is connected to an inlet 3c of the scroll 3. The exhaust gas of the associated engine is introduced through the inlet 3c into the scroll 3.

In this design, the turbine scroll 3 divided into a larger exhaust gas passage 3A and a smaller exhaust gas passage 3B by a projecting wall 5A of the turbine housing 5. The projecting wall 5A is inclined with respect to the shaft 2. Both of the larger and smaller passages 3A and 3B are open toward an inlet portion 1A a turbine wheel chamber containing of the turbine wheel 1.

A valve 6 is disposed in the engine exhaust duct 4 on the larger passage's side. The valve 6 is capable of controlling the flow of the exhaust gas flowing into the larger passage 3A. The exhaust gas is discharged axially through an outlet 7.

The valve 6 is operated by a control mechanism (not shown) in response to a supercharge pressure or other variables. In a low engine speed range, the valve 6 decreases the sectional area of the turbine scroll 3 by closing or restricting the larger passage 3A to provide an optimum supercharging characteristic in the low engine speed range, and thereby maintains a desired harmony between the engine and the turbocharger. In a high engine speed range, the valve 6 is open, and the exhaust gas is allowed to flow through both the larger and smaller passages 3A and 3B.

In this variable-capacity turbine, however, both of the larger and smaller scroll passages 3A and 3B are open toward the inlet portion 1A of the turbine wheel chamber. Accordingly, the larger scroll passage 3A tends to decrease the turbine efficiency when the larger scroll passage 3A is closed by the valve 6 at low engine speeds. When the larger passage 3A is shut off by the valve 6, there is formed a dead fluid zone in the larger passage 3A. In this state, the exhaust gas coming through the smaller passage 3B is directed to the turbine wheel 1 through the inlet portion 1A of the turbine wheel chamber, and there is formed a rotary flow 10 shown in FIG. 2A in the turbine wheel chamber inlet 1A around the turbine wheel 1. The fluid in the rotary flow 10 spreads out radially into the dead fluid zone of the shut-off larger passage 3A by reason of a centrifugal force of the rotary flow 10. This radiating fluid forms a circulating flow 11 in the larger passage 3A, as shown in FIG. 2B. This circulating flow 11 flows along the wall of the larger passage 3A, and accordingly loses its energy because of friction. The circulating flow 11 flows back into the rotary flow 10. In this way, the efficiency of the turbine is reduced.

Figure 3:
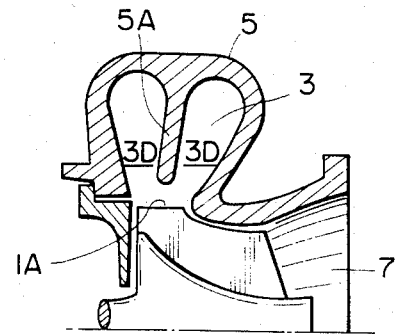
FIG. 3 is a sectional view of a turbine scroll of a conventional double entry housing type.

FIG. 3 shows another design of the turbine scroll, which is often referred to as a double entry housing type. In this design, the turbine scroll 3 is divided into two halves 3D and 3D by a wall 5A which projects from the outer circumference of the turbine scroll 3 and is approximately normal to the shaft of the turbine wheel. If one of the half passage 3D is closed by a valve, the same phenomenon as in the previous design appears, so that the efficiency is reduced as compared with a single entry type turbine scroll, and the response of the turbocharge pressure in the low speed range is deteriorated.

Figure 4:
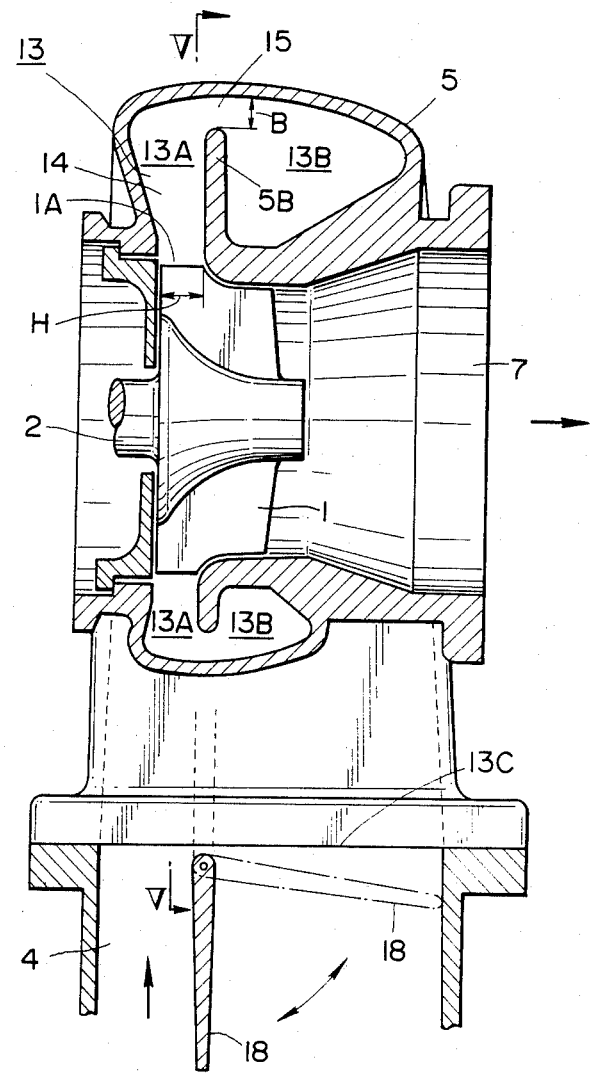
FIG. 4 is a sectional view of a turbine of a first embodiment of the present invention.

A first embodiment of the present invention is shown in FIG. 4. In FIG. 4, a turbine housing 5 is formed with a turbine scroll passage 13. The turbine scroll passage 13 consists of a main scroll passage 13A and a secondary scroll passage 13B. The main scroll passage 13A has a side aperture 14 opening toward the inlet 1A of the turbine wheel chamber. The secondary scroll passage 13B extends in parallel with the main scroll passage 13A. The secondary scroll passage 13B is separated from the main scroll passage 13A by a partition wall 5B extending longitudinally of the scroll 13. The secondary scroll passage 13B is isolated from the turbine wheel chamber inlet 1A by the partition wall 5B. The partition wall 5B is formed with a longitudinally extending opening 15 which provides a fluid communication between the main and secondary scroll passages 13A and 13B. The partition wall 5B is substantially normal to the axis of the turbine wheel 1 as shown in FIG. 4. However, the partition wall 5B may be slightly inclined.

As shown in FIG. 5A, the opening 15 extends along the outer wall of the turbine housing 5 defining the outer periphery of the scroll 13. The opening 15 has a width B, as measured in the radial direction, which is constant throughout substantially the full length of the opening 15. The opening 15 extends longitudinally from a throat or throttle portion 17 of the scroll 13, formed between a tongue portion 16 and the outer wall of the housing 5, to a narrowest portion of the scroll 13, positioned on the turbine wheel's side of the tongue portion 16. If it is not possible to make the opening 15 continuous over the full length for reasons of the layout or the construction of the turbocharger, it is advisable to make the discontinuous opening 15 and to make the total length of the discontinuous opening 15 as long as possible so as to minimize energy loss due to irregularity in fluid passage configuration.

A valve 18 is disposed in an exhaust duct 4 which is connected to the inlet 13C of the turbine scroll 13. The valve 18 is disposed on the secondary passage's side for controlling the volume of the fluid entering the secondary scroll passage 13B. The valve 18 is controlled by a control mechanism and an actuating mechanism (not shown). The valve is closed in a low engine speed range.

The inventors of the present application have found that an optimum turbocharge characteristic can be obtained if the following condition about the width B of the opening 15 is satisfied.

$$B \geq \frac{A_{BT}/R_B}{A_{AT}/R_A + A_{BT}/R_B} \times H \quad (1)$$

where $A_{AT}$: the area of the main scroll passage 13A at the throat portion 17A;

$A_{BT}$: the area of the secondary scroll passage 13B at the throat portion 17B;

$R_A$: the distance between the center 0 of the turbine wheel and the center of figure of the throat portion 17A;

$R_B$: the distance between the center 0 of the turbine wheel and the center of figure of the throat portion 17B;

H: the width of the turbine wheel blades at the inlet portion 1A of the turbine wheel chamber.

Accordingly, if the width B of the opening 15 must be tapered toward the downstream end for reason of design or other reason, the above-mentioned condition should be taken into consideration to minimize energy loss.

Figure 2A:
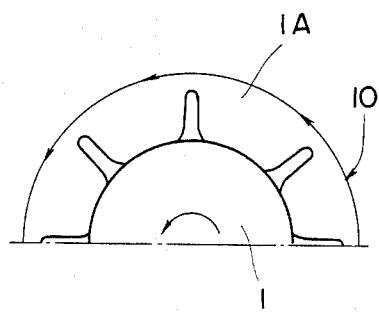
FIGS. 2A and 2B are views showing fluid flows in the turbine of FIG. 1.
Figure 2B:
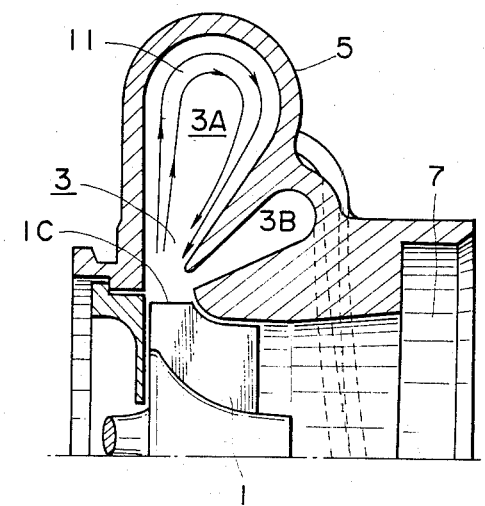

In the thus designed turbine scroll 13, the rotary flow 10 and the circularing flow 11 shown in FIGS. 2A and 2B do not appear in the secondary scroll passage 13B when the secondary scroll passage 13B is closed by the valve 18 in the low engine speed range. When the secondary passage 13B is closed, the dead fluid zone is formed in the secondary passage 13B. However, the secondary passage 13B is separated from the main passage 13A by the partition wall 5B, and the secondary passage 13B does not have an opening facing toward the turbine wheel chamber inlet 1A. Therefore, the secondary passage 13B does not undergo undesirable influence of the rotary flow existing around the turbine wheel chamber inlet 1A. The secondary passage 13B is open in the opening 15. However, the opening 15 does not face toward the turbine wheel chamber inlet 1A. The fluid flow is limited within the open main passage 13A as if there were a rigid wall formed by the static fluid at the opening 15.

Thus, the turbine of the present invention can provide a favorable turbocharging characteristic even in the low engine speed range like a single-entry scroll type turbine which has a throat with a small sectional area. In the low engine speed range, the turbocharge pressure rises in a desirable manner as in the single entry scroll turbine.

When the turbocharge pressure rises and reaches a predetermined value, the valve 18 starts to open the secondary passage 13B by the action of the control mechanism utilizing the turbocharge pressure or other variable. In the state where both of the scroll passages are open, the fluid flows through both passages 13A and 13B. The exhaust gas introduced into the secondary passage 13B flows into the main passage 13A through the opening 15, and then flows to the turbine wheel 1 together with the exhaust gas of the main passage 13A.

Within the scroll 13, the fluid velocity is lowest at the outermost position, in which the opening 15 is located. Therefore, the energy loss caused by the fluid flowing from the secondary passage 13B to the main passage 13A through the opening 15 is kept to a minimum. In the high engine speed range in which the exhaust gas flow at higher rates, the opening 15 causes almost no reduction of the turbine efficiency. Thus, the exhaust gas energy loss is very small even at high engine speeds, and the engine back pressure can be decreased.

In this embodiment, as shown in FIG. 4, the contour of the outer peripheral wall surface of the scroll passage 13 is continuous between the main and secondary passages 13A and 13B. The sectional area of the secondary passage 13B is larger than that of the main passage 13A, as shown in FIG. 4.

Figures 6A, 6B:
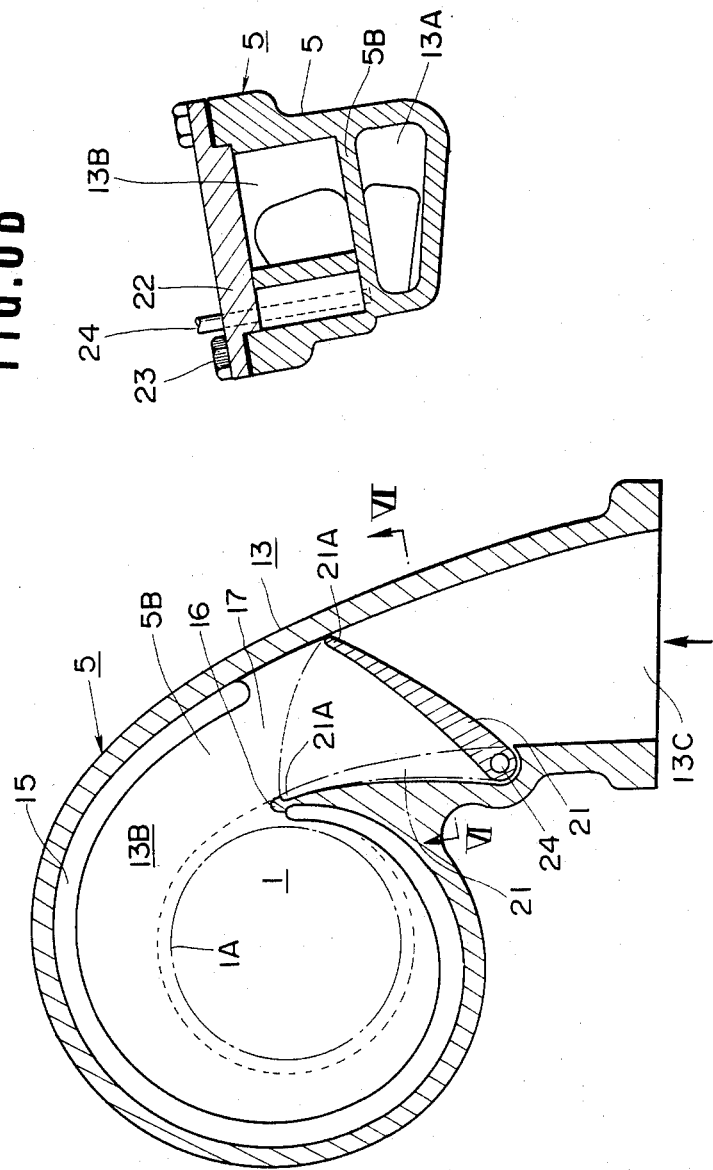
FIG. 6A is a sectional view of a turbine of a second embodiment of the present invention, which has a swing valve.
FIG. 6B is a sectional view taken along a line VI—VI of FIG. 6A.

A second embodiment of the present invention is shown in FIG. 6. In this embodiment, a valve 21 for opening and closing the secondary passage 13B is disposed within the secondary passage 13B of the turbine housing 5. The valve 21 of this embodiment is of a swing type. When the valve 21 is in its closed state, the plate of the valve 21 is received in a recess formed in the inner wall of the secondary passage 13B, as shown by a one-dot chain line in FIG. 6A. In this state, the outer surface of the valve plate 21 forms a continuous contour of the secondary passage 13B. The valve 21 swings on a shaft 24. In the closed state, a swingable end 21A of the valve 21 rests on the outer wall of the secondary passage 13B.

In this example, the plate of the valve 21 is approximately rectangular, and the secondary passage 13B is also approximately rectangular in cross sectional shape at least in the vicinity of the valve 21, as shown in FIG. 6B. A cover member 22 forming a side wall of the secondary passage 13B is parallel to the partition wall 5B, as shown in FIG. 6B. The cover member 22 is fastened to the turbine housing by bolts 23.

The shaft 24 for rotatably supporting the valve 21 extends out of the turbine housing 5, and is connected to an actuating mechanism (not shown). The actuating mechanism is arranged to open and close the valve 21 in response to a control signal such as the supercharge pressure. In the fully closed position, the swingable end 21A of the valve 21 is seated at a seat position on the inside surface of the outer wall of the scroll as shown by a solid line in FIG. 6A. This seat position is located upstream of the upstream end of the opening 15 near the throat portion 17. In addition, this seat position is located within a range in which the scroll passage has its curvature. The thus defined seat position is preferable.

When the valve 21 is slightly open, the exhaust gas stream is localized near the outer wall of the secondary scroll passage 13B. The outer wall of the secondary scroll passage 13B has a curvature near the end 21A of the valve 21, as mentioned above. Therefore, the exhaust gas continues to flow along the outer wall of the secondary scroll passage 13B owing to a centrifugal force. Thus, the exhaust gas flowing along the outer wall can smoothly flow into the main passage 13A through the opening 15 extending along the outer wall of the scroll passage 13. This smooth fluid flow from the secondary passage 13B to the main passage 13A assists the reduction of energy loss.

Unlike the first embodiment, the valve 21 of this embodiment is disposed within the turbine housing 5. Therefore, the exhaust duct 4 can be made shorter as compared with the first embodiment in which the valve is disposed in the exhaust duct 4. If the distance between the cylinder head of the engine and the turbine of the turbocharger is longer, more energy of the exhaust gas dissipates during travel therebetween. Thus, this embodiment can reduce dissipation energy loss. Besides, its short exhaust passage between the engine and the turbocharger is very advantageous to size reduction. Besides, the valve 18 of the first embodiment complicates the construction around the joint portion between the exhaust duct 4 and the inlet 13C of the turbine scroll 13, so that there is a fear of leakage in a gasket interposed between the exhaust gas duct 4 and the turbine scroll inlet 13C. The valve 18 disposed in the exhaust gas duct 4 is liable to cause the exhaust gas to leak into the main passage's side because of deterioration of the sealing effectiveness in the valve 18. The valve 21 of the second embodiment remedies such drawbacks. The turbine of this embodiment is especially suitable for turbochargers of small-sized automobiles because of its compact construction and its good efficiency.

FIGS. 7A and 7B shows another design of the valve 21. In this case, there is formed a valve seat 37 in the wall of the secondary passage 13B. The valve seat 37 is in the form of a ledge. In the fully closed position, the plate of the flap valve or swing valve 21 rests on the valve seat 37 so as to close the secondary passage 13B tightly.

A third embodiment of the present invention is shown in FIGS. 8A and 8B. In this embodiment, a valve 31 for opening and closing the secondary passage 13B is a rotary valve. The rotary valve 31 is disposed in the secondary passage 13B at a position adjacent to and slightly upstream of the throat portion 17. The rotary valve 31 is rotatable on a shaft 32. The rotary valve 31 is cylindrical. The rotary valve 31 has a cavity 31A having a bottom 31B. The cavity 31A is formed between circular ends 31C and 31C. The circular ends 31C and 31C are parallel to each other, and normal to the shaft 32. In the position shown by a solid line in FIG. 8A, the cavity bottom 31B of the rotary valve 31 almost perpendicular to the flow direction in the scroll 13. In this position, the secondary scroll passage 13B is fully closed by the rotary valve 31. From this fully closed position, the rotary valve 31 is rotated in a counterclockwise direction, as viewed in FIG. 8A, in order to open the secondary passage 13B. When the cavity bottom 31B is in a position shown by a broken line in FIG. 8A, the secondary passage 13B is fully open.

As shown in FIG. 8B, the cross section of the secondary passage 13B is made rectangular at least at a portion for receiving the rotary valve 31. The cross section of the rotary valve 31, cut by an intersecting plane passing through the axis of the rotary valve is rectangular, and closely fitted in the rectangular secondary passage 13B, as shown in FIG. 8B. The shaft 32 of the rotary valve 31 is supported by a bushing 33. A cover member 22 is fastened to the turbine housing 5 by bolts 23. An actuating lever 34 is connected to the shaft 32 of the rotary valve 31. The rotary valve 31 of this embodiment occupies less space in the secondary passage as compared with the swing valve 21 of the preceding embodiment. The rotary valve 31 requires the configuration of the scroll passage which is easier to fabricate than in the case of the swing valve 21 of the preceding embodiment. Accordingly, the rotary valve 31 can increase the degree of freedom in scroll design.

A fourth embodiment of the present invention is shown in FIGS. 9A and 9B. In this embodiment, the sealing effectiveness around the rotary valve 31 is improved. Seal members 41A and 41B shown in FIG. 9A are disposed in parallel with the shaft 32. In the closed state shown in FIG. 9A, the seal member 41A and 41B are in contact with the cylindrical surface of a solid segment portion 31D. The seal member 41A and 41B are, respectively, received in grooves formed in the walls of the scroll 13. Seal rings 41C and 41D are disposed, respectively, around the circular ends 31C and 31C. Each of the circular end 31C and 31C is formed with an annular groove on the outer cylindrical surface. The seal rings 41C and 41D are received, respectively, in the annular grooves of the circular ends 31C and 31C, and thereby attached to the rotary valve 31. The seal member 41A may be divided into two or more parts. The divided seal member 41A is convenient for fitting the seal member 41 into the groove. The seal member 41A is always pushed by the solid segment portion 31D whether the valve 31 is in the closed position or in the open position. Therefore, the seal member 41A can not slip off even if it is divided.

When the valve 31 is closed, there appears a pressure difference between the upstream side and the downstream side of the valve 31. This pressure difference tends to cause leakage of the exhaust gas around the closed valve 31 into the downstream side. The rotary valve of this embodiment can prevent such leakage of the exhaust gas, and thereby improve the supercharging characteristic at low engine speeds.

The seal members 41A and 41B and the seal rings 41C and 41D may be made of ceramic. The ceramic seal members and rings can prevent seizure which would occur in the contacting portions between the rotary valve 31 and the inside wall of the turbine housing 5. Ceramic is very suitable for the seal members and rings because of its superior heat resistance and compression strength. Each of the ceramic seal members and rings 41A, 41B, 41C and 41D may be divided into two or more parts. In this case, the separate parts are fitted together in the recess or groove.

A fifth embodiment of the present invention is shown in FIGS. 10A and 10B. A rotary valve 51 of this embodiment has a L-shaped cross section, as shown in FIG. 10B. The rotary valve 51 has a solid segment portion 51D whose cross sectional shape is a segment of a circle, and a circular end 51C which has a circular disc shape and to which the shaft 32 of the rotary valve 51 is fixed. The rotary valve 51 has one circular end 51C only. The other side of the rotary valve 51 is open. A cavity 51A of the rotary valve 51 is bounded by the circular end 51C on one side, but the other side of the cavity 51A is open. The open side of the cavity 51A faces the partition wall 5B of the turbine housing 5. The partition wall 5B is formed with a hole 42. The hole 42 opens into the cavity 51A. In the closed position shown in FIG. 10A, the hole 42 makes a fluid communication between the main scroll passage 13A and the secondary scroll passage 13B at a position upstream of the solid segment portion 51D of the rotary valve 51. This fluid communication through the hole 42 is maintained even in the valve open position. The hole 42 can relieve dynamic pressure acting upon the cavity bottom 51B when the valve 51 is in the closed position.

It is preferable to locate the hole 42 near to the groove bottom 51B in the closed position as much as possible in order to obtain a better effect of the hole 42. In view of the convenience in machining and casting processes, the size of the hole 42 as large as possible is preferred.

When the rotary valve 51 is kept in the closed position in the low engine speed range, there would appear, without the hole 42, a strong pressure difference between a high pressure exerted on the upstream side of the rotary valve 51 and a low static pressure remaining on the downstream side of the rotary valve 51 within the secondary passage 13B. This pressure difference would cause leakage of the exhaust gas around the rotary valve 51 to the downstream portion of the secondary passage 13B, and thereby impair the effect of the valve 51. The hole 42 provides a fluid communication between the main and secondary passages 13A and 13B on the upstream side of the rotary valve 51. In addition, the opening 15 provides a fluid communication between the main and secondary passages 13A and 13B on the downstream side of the rotary valve 51. Therefore, there exists only a very small pressure difference between the upstream and downstream of the valve 51. Thus, the hole 42 improves the sealing effectiveness of the rotary valve 41, and thereby improves the supercharging characteristic. Especially, the hole 42 causes the supercharge pressure to rise in a desirable manner in the low engine speed range. The hole 42 does not impair the function of the rotary valve 51. The exhaust gas flows through the main passage 13A in spite of the hole 42 when the valve 51 is closed. The hole 42 can improve the durability of the turbine by improving the sealing effectiveness of the valve. The hole 42 is also helpful for the arrangement in which a swing valve or flap valve is used in place of the rotary valve.

Figure 11B:
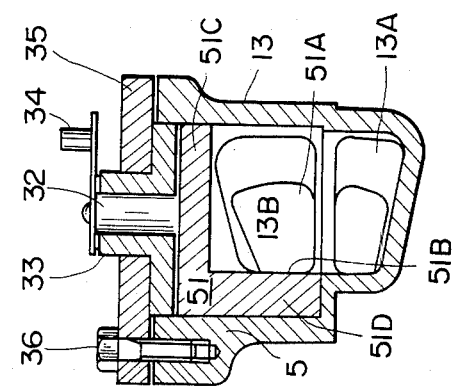
FIG. 11B is a sectional view taken along a line XI—XI of FIG. 11A.
Figure 11A:
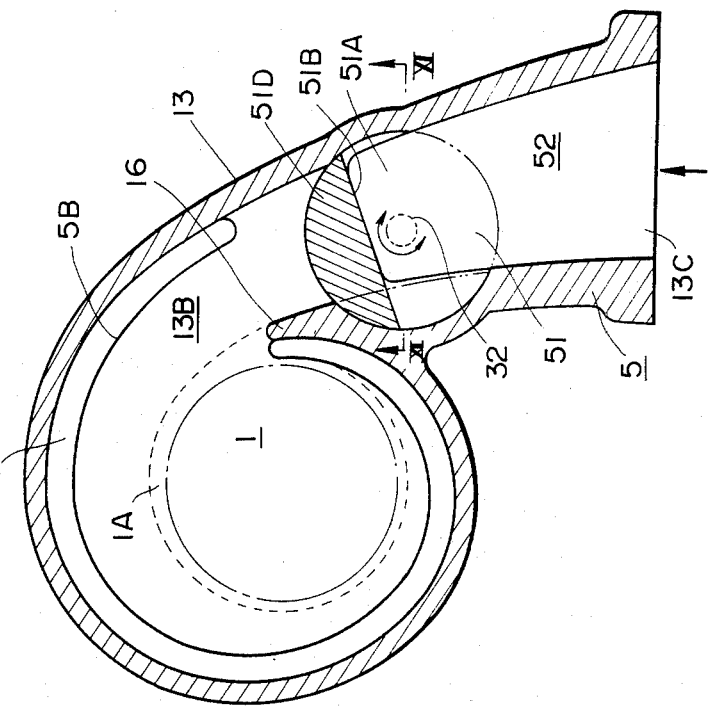
FIG. 11A is a sectional view of a turbine of a sixth embodiment, which has a rotary valve and in which an upstream part of a partition wall is removed.

A sixth embodiment of the present invention is shown in FIGS. 11A and 11B. The valve of this embodiment is identical to the valve 51 of the fifth embodiment. In this embodiment, the partition wall 5B separating the secondary passage 13B from the main passage 13A is removed in a range from the cavity bottom 51B of the rotary valve 51 when in the closed position to the inlet 13C of the scroll 13. There is formed a common portion 52 in which the scroll 13 is not divided into the main and secondary passages 13A and 13B. The common portion 52 extends from the scroll inlet 13C to the face of the cavity bottom 51B of the rotary valve 51 in the closed position. The common portion 52 is easier to fabricate than the hole 42 of the preceding embodiment. The common portion 52 is also helpful for the arrangement in which a swing valve or flap valve is used in place of the rotary valve. The same effects can be obtained by the common portion 52 as in the preceding embodiment. The common portion 52 is also helpful for the arrangement of a swing valve.

Figure 12:
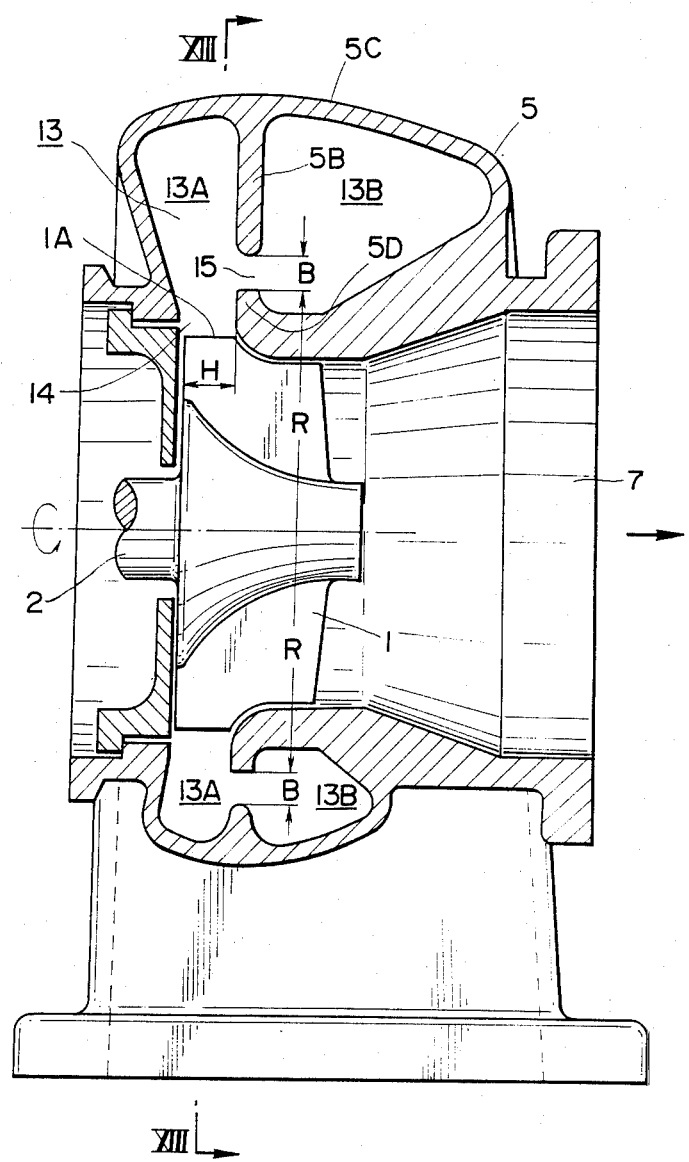
FIG. 12 is a sectional view of a turbine of a seventh embodiment, which has a different scroll design.
Figure 13:
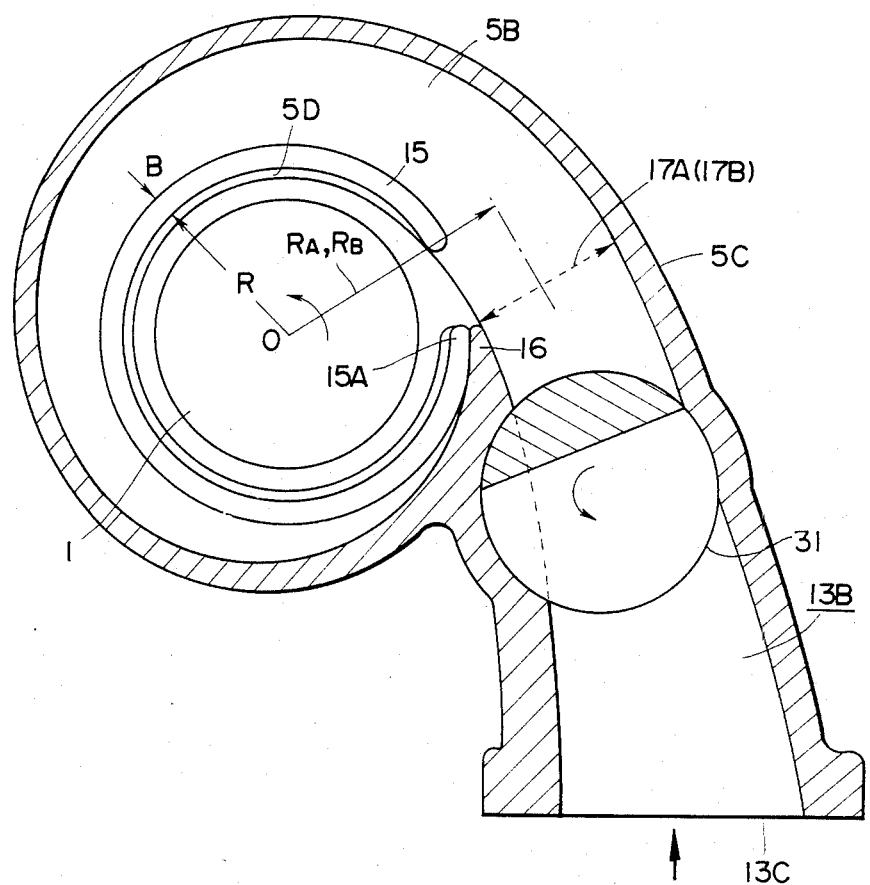
FIG. 13 is a sectional view taken along a line XIII—XIII of FIG. 12.

A seventh embodiment of the present invention is shown in FIGS. 12 and 13. In this embodiment, the opening 15 for making a fluid communication between the main and secondary scroll passages 13A and 13B is bounded between two concentric circles with their common center on the axis of the turbine wheel, as viewed in FIG. 13.

As in the preceding embodiments, the opening 15 is formed in the partition wall 5B of the turbine housing 5, diving the scroll 13 into the main and secondary scroll passage 13A and 13B. The opening 15 has an upstream end located near to and downstream of the tongue portion 16, and a downstream end located at the narrowest scroll portion formed by the tongue portion 16. The opening 15 extends longitudinally between the upstream and downstream ends. It is preferable to make a complete circle of the opening 15 around the center 0 of the turbine wheel 1 if circumstances permit. In this example, the opening 15 extends longitudinally through an angle slightly smaller than 360 degrees. The radial width B of the opening 15 is uniform over its length. Outer boundary and inner boundary of the opening 15 are circular and concentric to each other, and the common center of the concentric circular outer and inner boundaries lies on the axis of the turbine shaft 2.

The opening 15 extends longitudinally so that the opening 15 remains equidistant from the inlet portion 1A of the turbine wheel chamber. This design helps maintain uniformity in the fluid flows formed by the fluid coming through the secondary passage 13B and flowing into the turbine wheel chamber inlet 1A through the opening 15. The thus designed opening 15 saves energy loss caused by uneven fluid flow.

The condition (1) mentioned as to the first embodiment should be taken into consideration in determining the width B of the opening 15 when the width of the opening 15 is made narrow or taper.

As shown in FIG. 13, there is disposed, in the secondary scroll passage 13B, the rotary valve 31 identical to the rotary valve of the third embodiment shown in FIGS. 8A and 8B. The arrangements of the valve and its surroundings of the second, third, fourth, fifth and sixth embodiments can be applicable to this embodiment. Furthermore, the valve may be disposed upstream of the scroll inlet 13C within the engine exhaust duct 4 as in the first embodiment.

When the secondary scroll passage 13B is closed by the valve 31, there is formed a dead fluid zone in the secondary passage 13B. However, the secondary passage 13B does not have any opening which opens toward the turbine wheel chamber inlet 1A. Therefore, the rotary flow 10 and the circulating flow 11 shown in FIGS. 2A and 2B can not be formed in the dead fluid zone of the secondary passage 13B.

The fluid motion in the main scroll passage 13A is a free vortex. In the free vortex, the fluid velocity at a given radius diminishes as the radius increases. That is, the fluid velocity is inversely proportion to the radius. Thus, $V \times R_c$ remains constant, where $R_c$ is a radius at a given point in the scroll, and V is a fluid velocity at radius $R_c$). Therefore, the static pressure is lower in the vicinity of the turbine wheel chamber inlet 1A, and higher in the outer area near the outer periphery of the scroll.

The opening 15 of this embodiment extends along a line having the constant radius R, so that there does not appear a pressure difference due to a radius difference. Therefore, the fluid in the main passage 13A does not flow into the secondary passage 13B, so that the fluid flows toward the turbine wheel 1 in a desirable flow state.

In a medium engine speed range, the rotary valve 31 partly opens the secondary passage 13B. In this state, the fluid flows through the secondary passage 13B in addition to the main fluid flow through the main passage 13A. The rotary valve 31 opens the secondary passage 13B by rotating in a counterclockwise direction as viewed in FIG. 13, so that the secondary passage 13*b* is opened from the outer side. Because of such an arrangement of the rotary valve 31, the fluid flows along the outer periphery of the secondary passage 13B. Then, the fluid flows into the main passage 13A through the opening 15 at the downstream end of the opening 15 at first. As the opening degree of the rotary valve 31 increase, the fluid flows into the main passage 13A through a wider range of the opening 15.

When the rotary valve 31 is fully open, the exhaust gas is allowed to flow from the secondary passage 13B through the opening 15 over the full length, into the main passage 13A. Thus, all the exhaust gas is directed to the turbine wheel 1 efficiently, so that the back pressure of the engine is decreased and the engine output is improved.

As shown in FIG. 12, the partition wall 5B has an inner portion 5D formed on the inner side of the opening 15. The inner wall portion 5D projects radially outwardly between the main and secondary passages 13A and 13B. A portion of the exhaust gas in the secondary passage 13B loses its velocity through the action of friction and forms a secondary flow which stagnates near the inner periphery of the secondary passage 13B. The inner wall portion 5D serves as a fence or barrier for preventing such a secondary flow from entering the main passage 13A through the opening 15. The inner wall portion 5D thus makes a contribution to maintenance and improvement of turbine efficiency. The inner wall portion 5D helps a smooth confluence of the exhaust gas flowing through the opening 15 into the main passage 13A with the main flow, and thereby arranges the fluid flow directed to the turbine wheel 1 in a desirable condition.

The partition wall 5B shown in FIG. 12 is substantially perpendicular to the axis of the turbine wheel 1. However, the partition wall 5B may be inclined slightly so as to form a small angle with a plane perpendicular to the axis of the turbine wheel 1.

Figure 14:
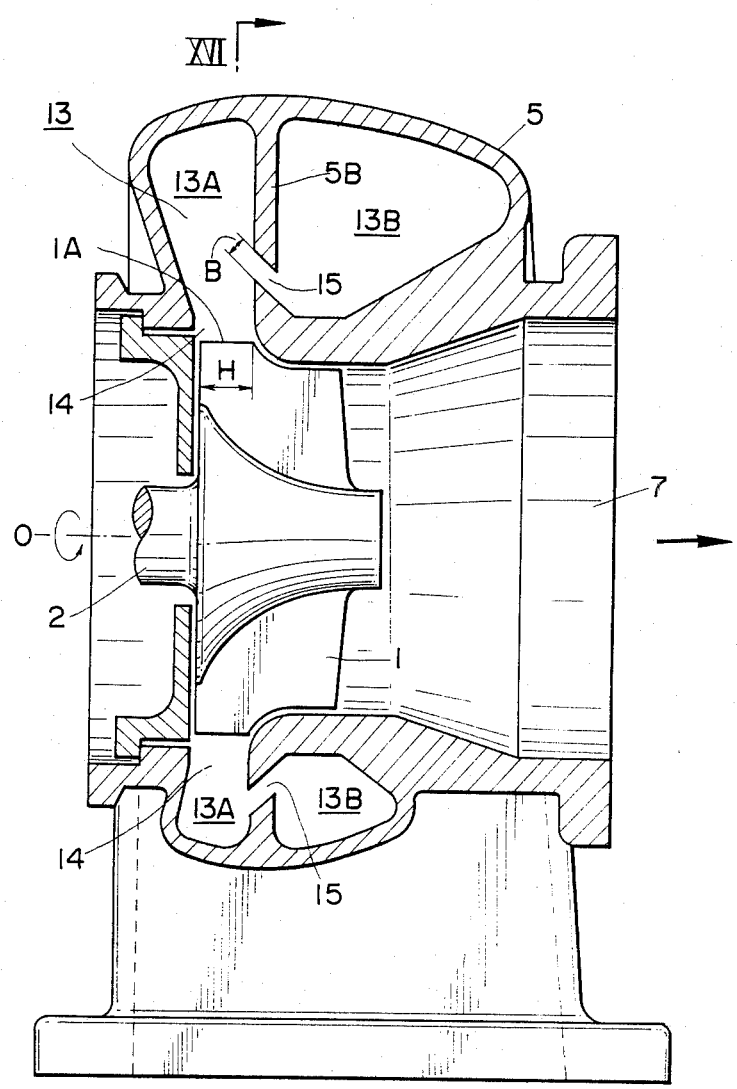
FIG. 14 is a sectional view of a turbine of a eighth embodiment, in which an opening of a partition wall is inclined.

An eighth embodiment of the present invention is shown in FIGS. 14 to 17. This embodiment is different from the seventh embodiment in that the opening 15 is inclined as viewed in the section of FIG. 14, cut by a plane passing through the axis of the turbine wheel 1. In the section of FIG. 14, the opening 15 is bounded by two parallel lines so that the width B of the opening 15 is constant. The opening 15 is wider apart from the axis of the turbine wheel 1 on the main passage's side, and closer to the axis of the turbine wheel 1 on the secondary passage's side. In other words, the opening 15 is bounded between two conical surfaces obtained by rotating two parallel straight lines around the axis of the turbine wheel 1 which the two parallel straight lines intersect at respective points on the secondary passage's side of the partition wall 5B.

Figure 15:
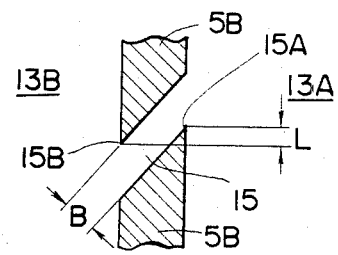
FIG. 15 is an enlarged fragmentary sectional view of the opening of FIG. 14.

The opening 15 has an outer conical boundary face having a secondary passage's side outer rim 15B, and an inner conical boundary face having a main passage's side inner rim 15A, as shown in FIG. 15. The main passage's side outer rim 15A overlaps the secondary passage's side inner rim 15B, as shown in FIG. 15. That is, the main passage's side outer rim 15A and the secondary passage's side inner rim 15B are both circular with their centers lying on the axis of the turbine wheel 1, and the radius of the secondary passage's side outer rim 15B is smaller than the radius of the main passage's inner side rim 15A by a length L, as shown in FIG. 15. The main passage's side outer rim 15A and the secondary passage's side inner rim 15B are formed at vertexs of sharp angles, respectively, as shown in FIG. 15. However, both or either of the rims 15A and 15B may be rounded as long as the overlap of the length L is maintained.

As in the preceding embodiments, it is preferable to make the opening 15 as long as possible in order to obtain a uniform fluid flow around the turbine wheel chamber inlet 1A. In this embodiment, the upstream end of the opening 15 is positioned as near to the tongue portion 16 as possible, and the downstream end is positioned in the narrowest portion of the scroll 13.

There is disposed the rotary valve 31 identical to the valve 31 of the third embodiment shown in FIGS. 8A and 8B. However, the valve designs of the first, second, fourth, fifth and sixth embodiments are also applicable to this embodiment.

The condition (1) mentioned as to the first embodiment is also applicable to this embodiment.

Figure 16:
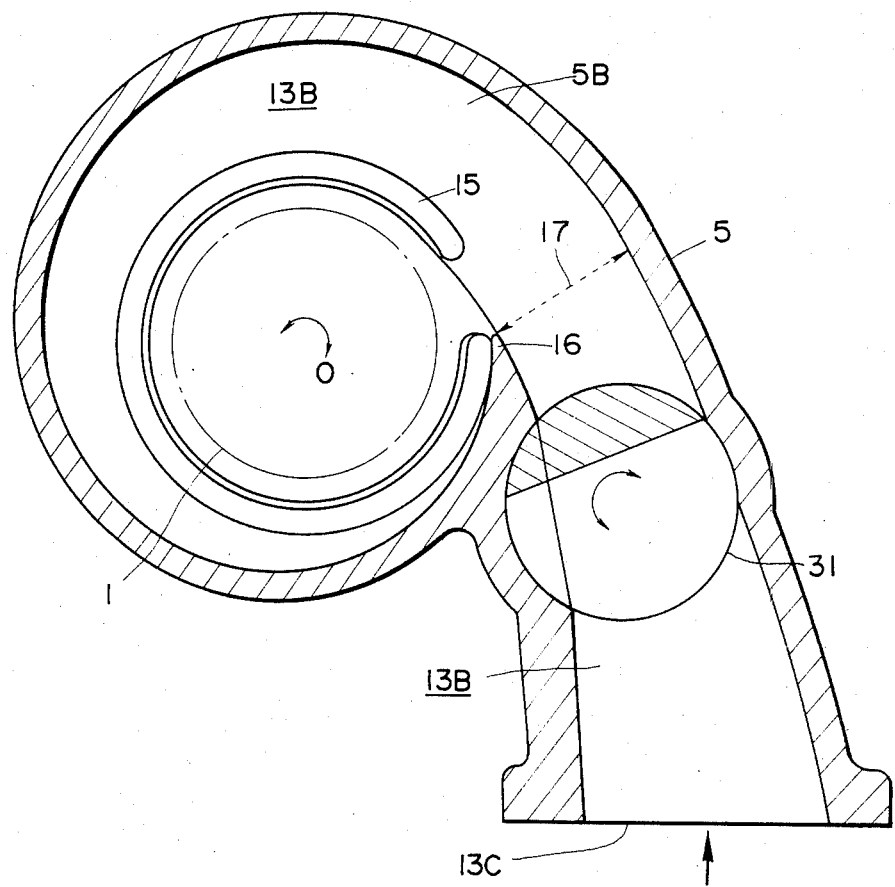
FIG. 16 is a sectional view taken along a line XVI—XVI of FIG. 14.

As in the seventh embodiment, the static pressure is constant over the full length of the opening 15 of this embodiment, because the section of the opening 15 shown in FIG. 16, cut by a plane normal to the axis of the turbine wheel 1, is bounded by two concentric circles whose common center lying on the axis of the turbine wheel 1. The opening of such a design helps maintain a desirable fluid flow condition.

Figure 17:
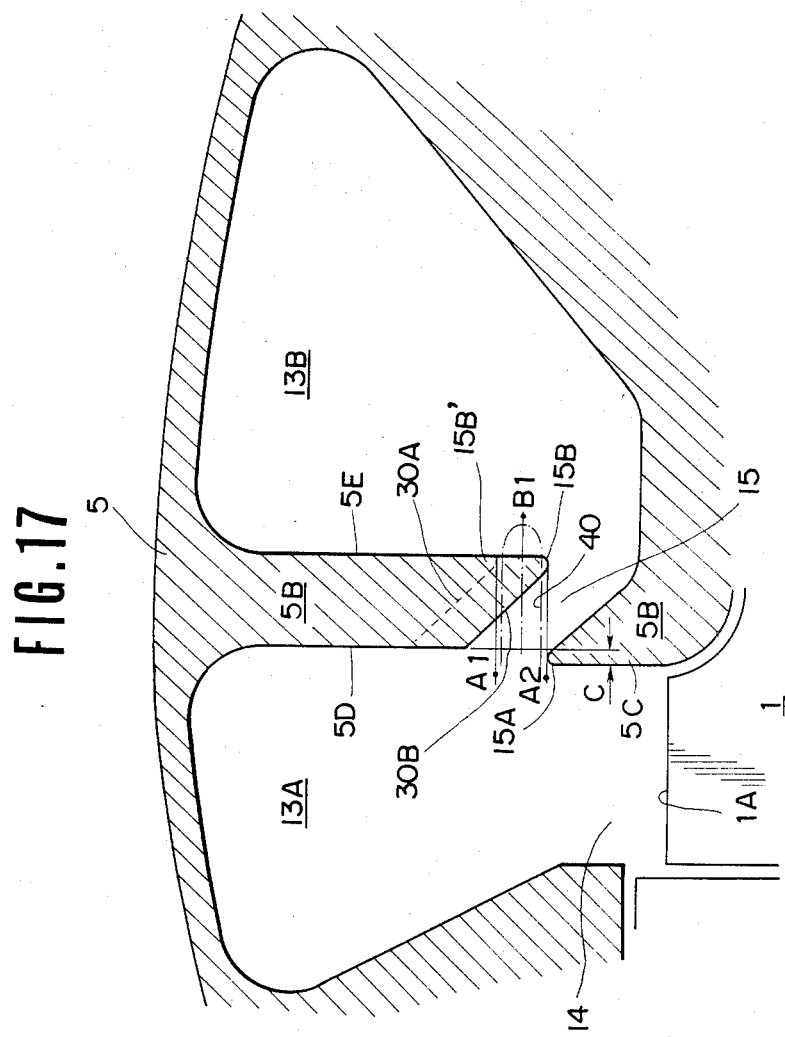
FIG. 17 is an enlarged sectional view of a turbine scroll of the eighth embodiment.

FIG. 17 shows the sectional shape of the opening 15 on an enlarged scale. In this example, the main passage's side inner rim 15A does not lie on a plane of a main passage's side surface 5D of the partition wall 5B, but is spaced at a distace C apart from the plane of the main passage's side wall surface 5D toward the main passage's side. The reason for this will be explained later.

A reference numeral 30A denotes an imaginary outer conical boundary face of the opening 15. The imaginary boundary face 30A has a secondary passage's side outer rim 15B'. If the opening 15 has the imaginary outer boundary face 30A, instead of the outer boundary face 30B, there would be no overlap between the main passage's side inner rim 15A and the secondary passage's side outer rim 15B'. A position A1 shown in FIG. 17 is located on the main passage's side of the partition wall 5B at a radius equal to the radius of the secondary passage's side outer rim 15B'. A position A2 is located on the main passage's side of the partition wall 5B at a radius equal to the radius of the main passage's side inner rim 15A. A position B1 is located on the secondary passage's side at a radius intermediate between the radii of the positions A1 and A2. A static pressure $P_{A1}$ at the position A1 is greater than a static pressure $P_{B1}$ at the position B1. The static pressure $P_{B1}$ is greater than a static pressure $P_{A2}$ at the position A2.

Therefore, if the opening 15 has no overlap, there would be formed a secondary flow 40 moving from the position A1 to the position B1 and then from the position B1 to the position A2, as shown by a one-dot chain line in FIG. 17. In this case, the fluid of the rotary flow in the main passage 13A would flow from the main passage 13A into the secondary passage 13B, and instead the fluid of the dead fluid zone having a low energy would be returned from the secondary passage 13B to the main passage 13A. This would result in energy loss of fluid.

This undesired tendency toward the secondary flow can be prevented by the overlap of the opening 15 or by the arrangement in which the main passage's side inner rim 15A and the secondary passage's side outer rim 15B of the opening 15 are positioned at equal radii (, that is, the amount of the overlap is zero.). Even if the fluid of the rotary flow flows from the main passage 13A into the secondary passage 13B, a secondary passage's side surface 5E of the partition wall 5B prevents the fluid flow from the secondary passage 13B to the main passage 13A. Thus, energy loss is minimized.

Figure 18:
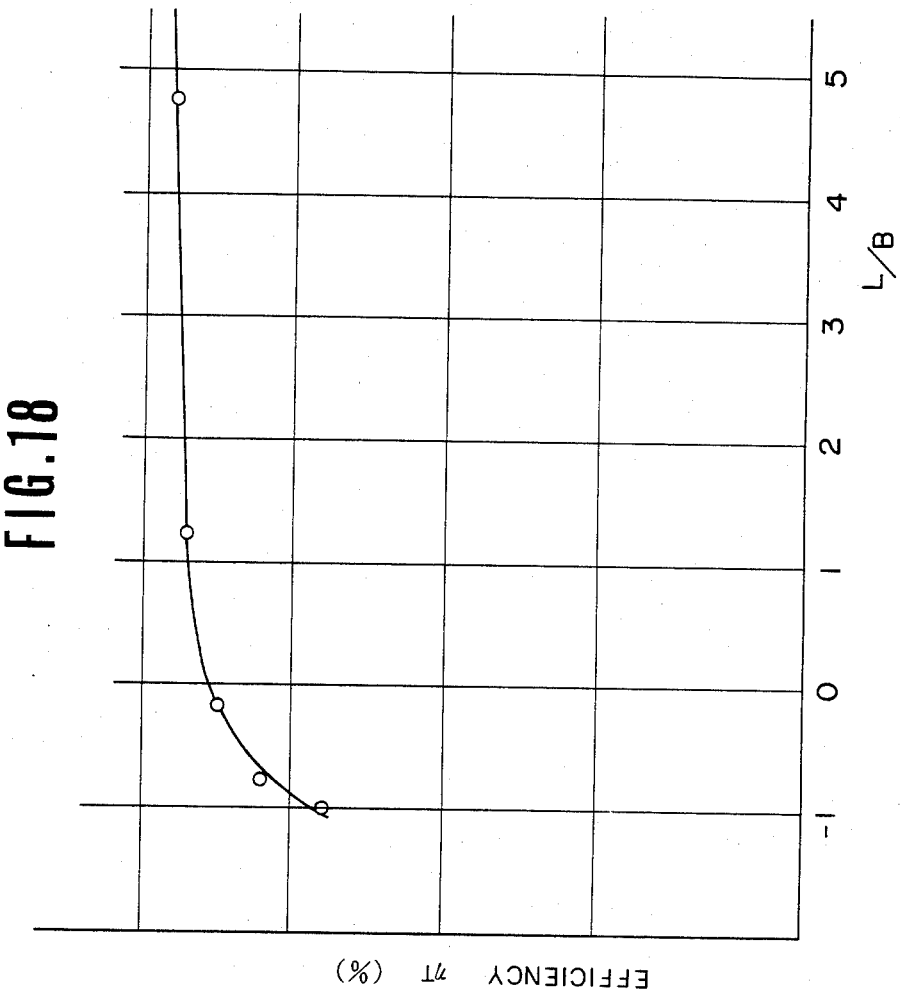
FIG. 18 is a diagram showing a relation between a turbine efficiency and a sectional shape of the opening.

FIG. 18 shows the results of the experiment on the effect of the overlap, performed by the inventors of the present application. The axis of abscissas expresses a ratio L/B between the amount of the overlap L and the width B of the opening 15. The axis of ordinates expresses a turbine efficiency in the low speed range. The turbine efficiency decreases sharply, as the ratio L/B decreases below zero. The ratio L/B is zero, when the amount of the overlap L is zero. In the case that the width B of the opening 15 and the thickness of the partition wall are constant, the inclination of the opening 15 gradually diminishes toward the left end of the axis of abscissas.

As evident from FIG. 18, it is preferable to make the amount of the overlap L equal to or greater than zero. If the zero or positive overlap is not feasible for some reason, it is desirable to make the ratio L/B equal to or greater than −0.25.

In the intermediate engine speed range, the valve 31 partly opens the secondary passage 13B. At first, the fluid in the secondary passage 13B is allowed to flow into the main passage 13A through the downstream end portion of the opening 15 at the narrowest portion of the scroll 13. The range of the opening 15 through which the fluid is allowed to flow from the secondary passage 13B to the main passage 13A expands gradually from the downstream end toward the upstream end in accordance with the opening degree of the valve 31.

In the high engine speed range, the valve 31 is fully open, and the fluid flows efficiently from the secondary passage 13B to the main passage 13A through the full length of the opening 15. Thus, the pressure at the inlet of the turbine, that is, the back pressure of the engine, is decreased, and the engine output is improved.

In the example shown in FIG. 17, there is a difference in level between the main passage's side surface 5D of the partition wall 5B outside of the opening 15 and a main passage's side surface 5C of the partition wall 5B within the opening 15. The surface 5C lying inside of the opening 15 projects at the distance C from the surface 5D lying outside of the opening 15. The main passage's side inner rim 15A of the opening lies on the surface 5C projecting from the surface 5D. In the state in which the exhaust gas is introduced into the secondary passage 13B as well as the main passage 13A, the fluid loses the energy through the friction with the wall of the secondary passage 13B, gathers near the inner periphery of the secondary passage 13b, and forms a secondary flow. This secondary flow tends to move directly to the turbine wheel chamber inlet 1A. The main passage's side inner rim 15A serves as a barrier or a boundary layer fence for preventing such a secondary flow from moving directly to the turbine wheel chamber inlet 1A. Moreover, the main passage's side inner rim 15A helps a smooth mixture between the main flow in the main passage 13A and the flow from the secondary passage to the main passage through the opening 15. Thus, the main passage's side inner rim 15A improves the turbine efficiency and provides an desirable turbine performance over all the operating ranges by improving the fluid flow condition around the turbine wheel chamber inlet 1A.

The main passage's side inner rim 15A projecting at the distance C from the surface 5D of the partition wall 5B outside of the opening 15 introduces the fluid in a boundary layer formed on the wall surface 5D, into the secondary passage 13B. By so doing, the rim 15A further prevents the secondary flow in the secondary passage 13B from being directly introduced into the turbine wheel chamber inlet 1A.

It is desirable to locate the opening 15 at a radius as large as possible in order to improve the efficiency in the medium and high engine speed ranges in which the exhaust gas is introduced into the secondary passage 13B.

The partition wall 5B shown in FIGS. 14 and 17 is normal to the axis of the turbine wheel 1. However, the partition wall 5B may be inclined with respect to a plane normal to the axis of the turbine wheel 1.

Figure 19:
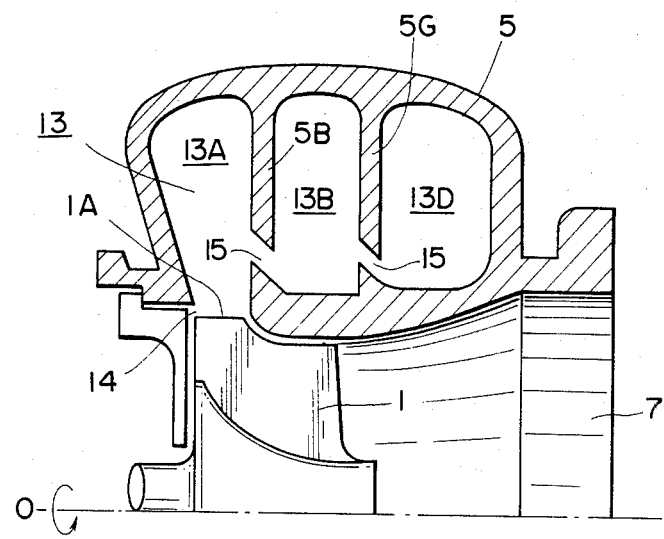
FIG. 19 is a sectional view of a turbine of a ninth embodiment of the present invention, which has three scroll passages.

A ninth embodiment of the present invention is shown in FIG. 19. In this embodiment, there are formed a third scroll passage 13D in addition to the main passage 13A and the secondary passage 13B. A partition wall 5G of the turbine housing 5 separates the third passage 13D from the secondary passage 13B. An opening 15' is formed in the partition wall 5G. The opening 15' is similar to the opening 15 of the partition wall 5B in radial position, longitudinal length and sectional shape. A valve is provided in an upstream portion of the third scroll passage 13D, as in the secondary passage 13B. The fluid flow can be controlled more widely by controlling the valves of the secondary passage 13B and the third passage 13D.

It is optional to provide an exhaust bypass valve or wastegate valve in the secondary passage 13B or the third passage 13D. With this valve, excess turbine speed can be prevented as is known in the art.

The partition walls 5B and 5G may be normal to the axis of the turbine wheel or inclined with respect to a plane normal to the axis of the turbine wheel 1.

What is claimed is:

1. A variable-capacity radial turbine, comprising:
   a turbine wheel,
   a turbine housing enclosing said turbine wheel, said turbine housing having an inlet port for receiving a fluid, a scroll passage for directing the stream of the fluid from said inlet port to said turbine wheel, a turbine wheel chamber containing said turbine wheel, and an outlet passage for discharging the fluid from said wheel chamber, said scroll passage being divided into a first scroll passage and a second scroll passage by a partition wall extending longitudinally in the scroll passage so as to form two parallel flow paths, said first scroll passage being formed with a side aperture through which the fluid in said first passage is allowed to flow toward the outer periphery of said turbine wheel, said partition wall being formed with an opening through which the fluid is allowed to flow between said first and second passages, said opening extending longitudinally of said scroll passage, wherein said second scroll passage is isolated from said wheel chamber by said partition wall so that the fluid in said second passage can flow into the turbine wheel chamber only through said opening and said side aperture, and
   valve means for opening and closing said second passage.

2. A turbine according to claim 1, wherein said opening extends along the outer periphery of said scroll passage.

3. A turbine according to claim 2, wherein said opening extends through approximately one round around said turbine wheel.

4. A turbine according to claim 3, wherein the width of said opening is constant substantially over the full length of said opening.

5. A turbine according to claim 4, wherein said partition wall is substantially normal to the axis of said turbine wheel.

6. A turbine according to claim 5, wherein said opening has an upstream end and a downstream end, and extends between both ends, said upstream end being located near a tongue portion of said turbine housing, said tongue portion projecting inwardly toward the periphery of said turbine wheel and forming a throat portion of said scroll passage on the outer side with the outer wall of said turbine housing, and a narrowest portion of said scroll passage on the inner side, said downstream end being located at the narrowest portion of said scroll passage.

7. A turbine according to claim 1, wherein said valve means comprises a duct fixed to said turbine housing and fluidly connected to said inlet port, and a valve, disposed in said duct, for opening and closing said second passage.

8. A turbine according to claim 1, wherein said valve means comprises a valve disposed in said second scroll passage upstream of an upstream end of said opening.

9. A turbine according to claim 8, wherein said valve is a swing type valve.

10. A turbine according to claim 9, wherein said swing valve comprises a plate having a first end pivotally supported on the inner wall of said second passage, and a swingable second end which abuts on the outer periphery of said second passage at a position upstream of said first end and downstream of and near to the upstream end of said opening when said valve fully closes said second passage, and which abuts on the inner periphery of said second passage at a point upstream of said first end when said valve fully opens said second passage, the inner wall of said second passage being formed with a recess for receiving said plate of said valve when said valve fully opens said second passage.

11. A turbine according to claim 10, wherein the wall of said secondary passage is formed with a ledge for receiving said swingable second end of said plate when said valve fully closes said second passage.

12. A turbine according to claim 8, wherein said valve is a rotary valve.

13. A turbine according to claim 12, wherein said rotary valve comprises a cylindrical rotary member having a solid portion and a hollow portion separated from each other by an interface which is substantially parallel to the axis of said cylindrical rotary member, said interface being substantially in parallel to the flow direction in said second passage and said hollow portion allowing the fluid flow therethrough when said valve is in the fully open position.

14. A turbine according to claim 13, wherein said rotary valve is arranged to open said second passage from the outer periphery, said interface being inclined with respect to the longitudinal direction of said second passage so as to guide the fluid toward the outer periphery of said second passage when said valve partly opens said second passage.

15. A turbine according to claim 14, wherein said hollow portion has a cavity sandwiched between two side walls.

16. A turbine according to claim 15, wherein said rotary valve further comprises seal means for preventing the fluid from passing through said valve when said valve is in the fully closed position.

17. A turbine according to claim 16, wherein said seal means comprises two seal rings disposed around the outer cylindrical surface of said cylindrical rotary member on both sides of said cavity, and two seal members which extend in parallel to the axis of said cylindrical rotary member, said seal members being received, respectively, in two grooves formed in the walls of said second passage on both sides of said second passage, and coming in contact with the outer cylindrical surface of said solid portion when said valve is in the fully closed position.

18. A turbine according to claim 14, wherein the axis of said cylindrical rotary member is substantially normal to said partition wall, said hollow portion of said cylindrical rotary member having a cavity which is sandwiched between a side wall of said cylindrical cavity member and said partition wall, said partition wall being formed with a hole which opens into said cavity at a position upstream of said interface when said valve is in the fully closed position.

19. A turbine according to claim 8, wherein said partition wall is formed with a hole located upstream of a position at which said secondary passage is closed by said valve.

20. A turbine according to claim 8, wherein an upstream end of said partition wall is located at a position at which said secondary passage is closed by said valve, so that said scroll passage is not divided into said main and second passages from said inlet port to the position of said valve.

21. A turbine according to claim 1, wherein said opening is bounded between two coaxial cylindrical surfaces whose common axis coincides with the axis of said turbine wheel.

22. A turbine according to claim 21, wherein the inner periphery of said second scroll passage lies within the cylindrical surface defining the inner boundary of said opening.

23. A turbine according to claim 1, wherein said opening, as viewed in a section cut by a plane normal to the axis of said turbine wheel, is bounded between two concentric circles whose common center lies on the axis of said turbine wheel, and said opening, as viewed in a section cut by a plane passing through the axis of said turbine wheel, is bounded between two parallel straight lines which are inclined with respect to the axis of said turbine wheel so that said opening is wider apart from the axis of said turbine wheel on the first passage's side than on the second passage's side.

24. A turbine according to claim 23, wherein said opening has concentric circular inner and outer rims on the main passage's side and concentric circular inner and outer rims on the second passage's side, the radius of the main passage's side inner rim is equal to or greater than the radius of the second passage's side outer rim.

25. A turbine according to claim 1, wherein said scroll passage further comprises a third scroll passage which is separated from said second passage by a second partition wall extending longitudinally of said scroll passage, said second partition wall being formed with a second opening extending longitudinally of said scroll passage.

* * * * *